United States Patent
Altorfer

[11] 3,746,118
[45] July 17, 1973

[54] THREE-WHEELED VEHICLE WITH PASSENGER BANKING

[76] Inventor: Edward J. Altorfer, 4364 Eaglemere Ct., S.E., Cedar Rapids, Iowa

[22] Filed: July 15, 1971

[21] Appl. No.: 162,766

[52] U.S. Cl............ 180/25 R, 280/112 A, 280/267
[51] Int. Cl............................ B62d 7/20, B62k 5/08
[58] Field of Search...................... 180/25 R, 26, 27; 280/112 R, 112 A, 267, 269

[56] References Cited
UNITED STATES PATENTS

| | | | |
|---|---|---|---|
| 2,493,817 | 1/1950 | Hare | 180/25 R |
| 2,152,938 | 4/1939 | Welch | 280/112 A |
| 2,819,093 | 1/1958 | Geiser | 280/112 A |
| 3,447,623 | 6/1969 | Hott | 180/25 R |
| 3,572,456 | 3/1971 | Healy | 180/27 |

OTHER PUBLICATIONS
German Printed Application DAS 1,063,473, August, 1959, NSU-werke.

Primary Examiner—Benjamin Hersh
Assistant Examiner—Leslie J. Paperner
Attorney—Dawson, Tilton, Fallon & Lungmus

[57] ABSTRACT

A three-wheeled vehicle is disclosed having two front wheels connected by means of an axle and a single powered rear wheel centered between the two front wheels. A steering column is connected to a frame which supports the engine and the rider, and the lower end of the steering column is pivotally connected to the front axle assembly. Foot pedals are provided on either side of the engine frame—one is for acceleration and the other is for braking. Both foot pedals are attached to a support which is connected to the front axle assembly. The bottom of the engine frame is pivotally connected to a yoke at a location rearward of the front wheels. A power-actuated mechanism banks the steering column and engine frame about an inclined bank axis when the vehicle is turned to enhance the stability of the vehicle and the comfort of the rider.

7 Claims, 6 Drawing Figures

Patented July 17, 1973 3,746,118
2 Sheets-Sheet 1
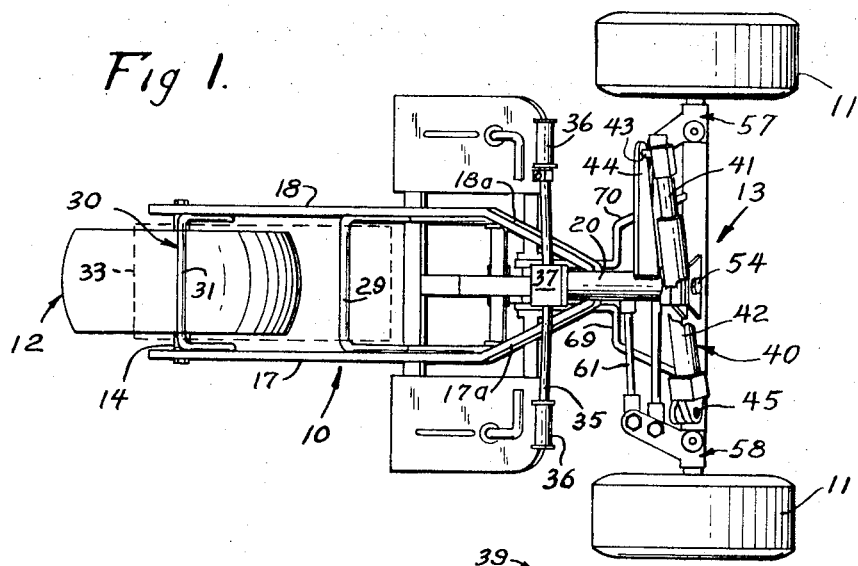
Fig. 1.
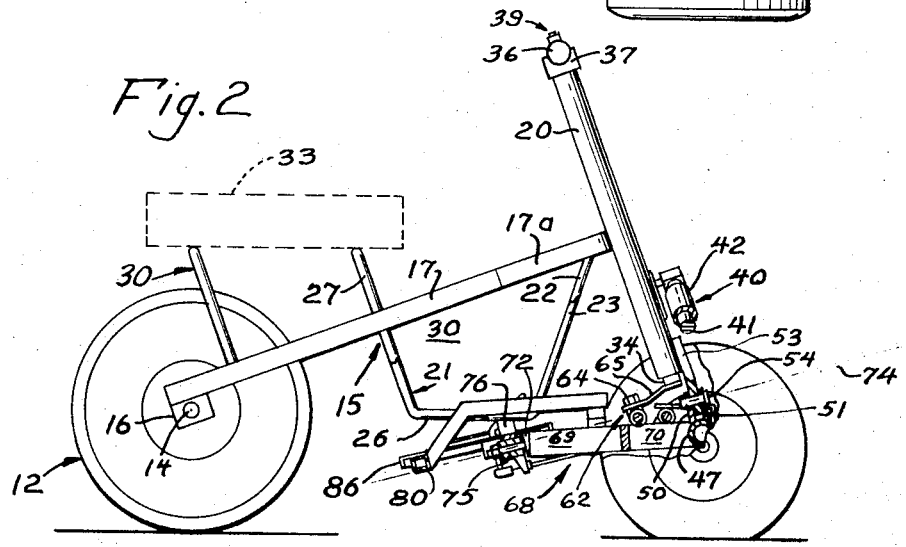
Fig. 2.
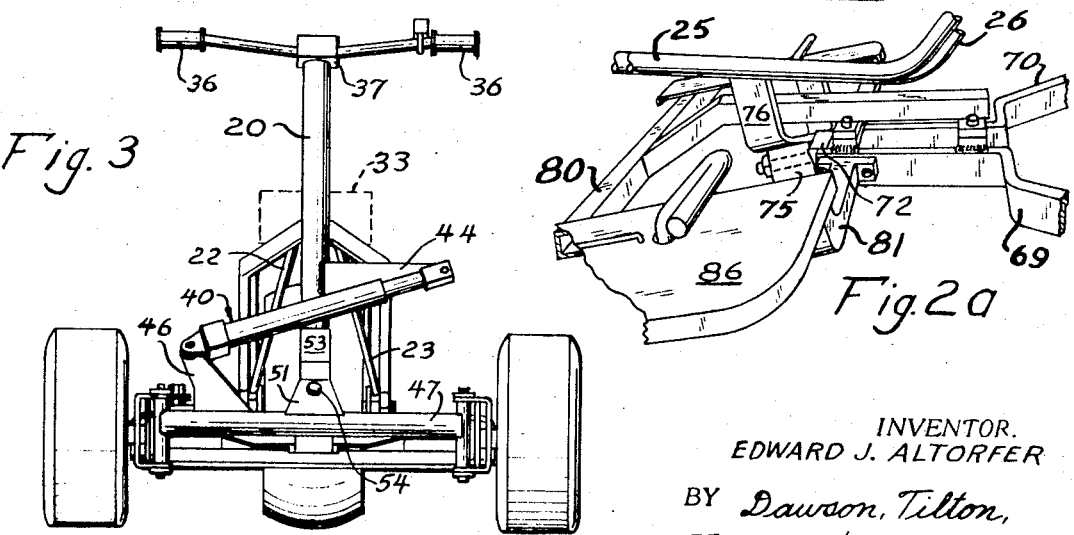
Fig. 3.
Fig. 2a
INVENTOR.
EDWARD J. ALTORFER
BY Dawson, Tilton,
Fallon and Lungmus
Atty's.

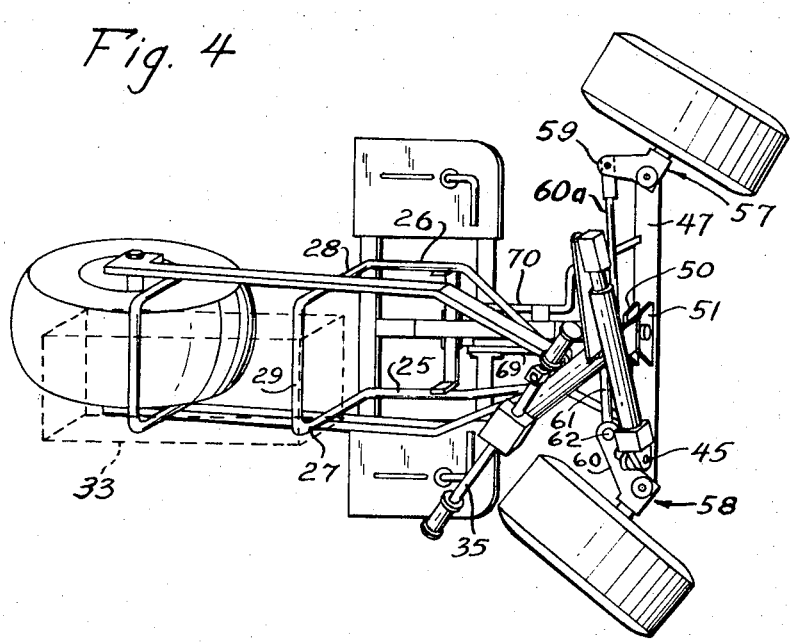
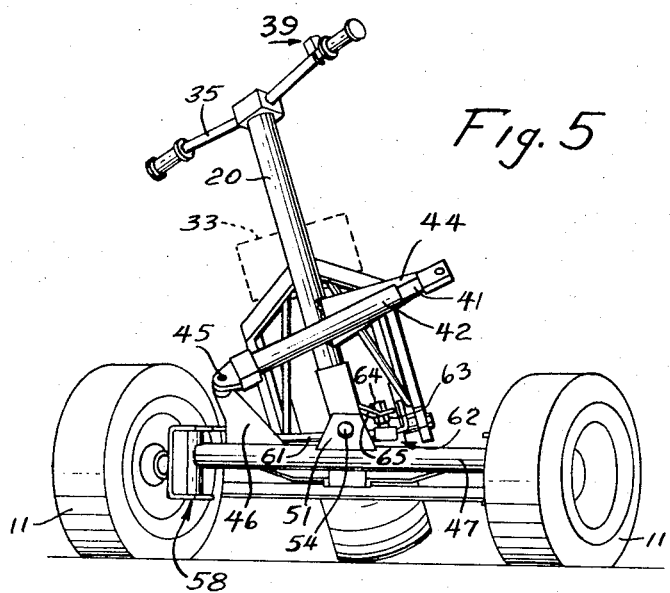

THREE-WHEELED VEHICLE WITH PASSENGER BANKING

BACKGROUND OF THE INVENTION

The present invention relates to an automotive vehicle adapted to be driven on a street. The vehicle is similar to a motor scooter except that it has three wheels. The rider and passenger, if any, straddle the engine and are supported by the engine frame.

Two-wheeled motor scooters are known and in common usage. When the two-wheeled motor scooter is stopped, the rider must use one leg to balance it, as with a motorcycle. This is an inconvenience, particularly in the case of an elderly rider.

Three-wheeled motorcycles are also known, usually the third wheel is offset laterally relative to the other two wheels and adapted to support a side car. The problem with three-wheeled automotive vehicles is the instability of the vehicle when making a turn. The likelihood of tipping is even greater for the case of a rider seated high on the vehicle because the center of gravity of the vehicle and rider is high relative to the wheel base. A two-wheeled vehicle does not have this stability problem because of its ability to bank into a turn.

SUMMARY

The present invention combines the stability of a three-wheeled automotive vehicle in the motor scooter class with the stability and riding comfort of a two-wheeled vehicle. Two front wheels are connected to a common axle. A rear wheel is centered relative to the two front wheels, and it is connected to a frame which also carries the engine, the drive assembly, and the seat and rider. This main frame (sometimes herein called the engine frame) is rigidly connected to a steering column. The lower end of the steering column is pivotally connected to the front axle assembly for pivoting about a line (called the "banking axis") which extends from a point just above the front axle to the point at which the rear tire engages the ground. The engine frame of the vehicle is also pivotally connected to a rear extension of the front axle assembly at a location on the banking axis to stabilize the lower portion of that frame during banking.

The rider may initiate and control the banking action by turning a handle grip which actuates a switch for energizing a reversible linear actuator. The linear actuator is pivotally connected at one end to the front axle assembly and pivotally connected at its other end to an extension of the steering column so that when it is energized, a rod is extended to tilt the steering column and the engine frame as a unit about the banking axis. By rotating the handle grip in the opposite direction, the banking action is reversed.

Accleration and braking are controlled by the rider by means of pedals on foot rests on either side of the engine frame which the rider straddles. The foot rests are securely mounted to the front axle assembly. Hence, they do not bank with the engine frame—thereby giving the rider a feeling of ground support and stability even during banking while, at the same time, permitting the body of the rider to bank into the turn.

Thus, the present invention provides for a three-wheeled automotive vehicle wherein the banking of the rider and engine frame is controlled to give a greater feeling of stability and comfort during riding. This is accomplished by a power mechanism which tilts the engine frame about an axis extending along the longitudinal vertical center plane of the vehicle and which is inclined upwardly at its forward end.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a plan view of a three-wheeled automotive vehicle incorporating the present invention with portions of the vehicle removed for clarity;

FIG. 2 is a side elevational view of the vehicle of FIG. 1 in an upright position with the front axle assembly shown in cross section;

FIG. 2a is a perspective view of the foot rests illustrating pivotal connection between the engine frame and front axle assembly;

FIG. 3 is a front end view of the vehicle of FIG. 1; and

FIGS. 4 and 5 are plan and front views respectively of the vehicle of FIG. 1 showing the banking action.

DETAILED DESCRIPTION

Turning first to FIG. 1, a three-wheeled vehicle is generally designated by reference numeral 10, and it includes two front wheels 11 and a rear wheel 12. The front wheels 11 are connected together by means of a front axle assembly 13, and the rear wheel 12 is mounted on an axle 14. It will be observed that the vehicle has a vertical center plane which passes generally midway between the front wheels and through the center of the rear wheel.

The rear wheel 12 is driven by means of a conventional gasoline engine which is not shown, for brevity. The gasoline engine may be of a two- or four-cycle type, and it may have a horsepower in the range of 3 horsepower up to 12 or 15 horsepower. The vehicle preferably is intended for convenience use, for example, with elderly people, to provide short-range and economical travel.

Turning now to FIG. 2, it can be seen that the rear axle 14 is connected to a main or "engine"frame generally designated 15 by means of side journal blocks 16. The engine frame 15 includes a pair of side diagonal bars 17 and 18 which are bent inwardly at the front, as at 17a and 18a in FIG. 1; and they are welded to an upright steering column 20.

The main frame 15 also includes a tubular frame member 21 which is welded at its front ends to the inwardly inclined portions 17a and 18a of the side frame bar 17 and 18, and extends downwardly and outwardly thereof as at 22 and 23 in FIG. 3. The tubular frame member 21 is then turned rearwardly to form the horizontal members 25 and 26, at the ends of which the tubular frame member 21 is turned upwardly to form the rearwardly inclined members 27 and 28 which are joined at their tops by a transverse horizontal frame member 29. The tubular frame 21 forms a support for the engine (which is generally located in the position designated 30 in FIG. 2) and battery which is illustrated by the dashed line 31 and supported by means of a case 32. The battery 31 is conventional 21-volt dc battery commonly used for general automotive purposes.

A second tubular frame member generally designated by reference numeral 30 is formed in an inverted U-shape and welded at its lower ends to the side frame bars 17 and 18 at a location adjacent the rear wheel 12 so as to form an upper transverse bar 31. The transverse bars 29 and 31 support a rider seat shown in phantom by dashed line 33.

A steering shaft, the bottom of which is seen at 34 in FIG. 2 is journaled within the steering column 20. A handle or steering bar 35 having side grips 36 is connected to the steering shaft by means of a cap and bushing 37. Located adjacent the left handle grip 36 is a switch 39. The switch 39 has a forward position at which a first contact is actuated, a center or upright position at which no contact is activated, and a reverse position at which a second contact is activated. The switch is spring-biased toward the center position, and it is actuated by the rider's turning of the handle grip to thereby initiate the banking action, as will be described in detail presently.

Associated with the switch 39 is a set of wires coupling energy from the battery 31 to a reversible linear actuator generally designated by reference numeral 40. The actuator 40 may be any of a number of commercially available electric motors wherein the application of electrical power causes forward or reverse translation of a rod. In the present embodiment, a rod 41 is received within a sleeve 42. The rod 41 is pivotally connected as at 43 to a bracket 44 extending to the left side of the steering column 20 (as viewed by a rider). The sleeve 42 of the actuator 40 is pivotally connected at 45 to an upstanding bracket 46 which is welded to a transverse front axle 47 comprising one element of the front axle assembly 13. At the center of the axle 47 are two upstanding plates 50, 51 which are spaced to assume rear and front positions respectively, and these plates are slightly inclined toward the rear, generally assuming the inclination of the drive shaft 20. A plate 53 welded to the lower front end of the drive column 20 is received within the trunnion formed by the plates 50, 51, and a pin 54 is placed through aligning apertures in the plates 51, 53 and 50, in that order so as to provide a pivotal connection between the drive column 20 and the front axle 47. The pin 54 is held in place by a cotter pin.

The front wheels 11 are connected to the front axle 47 by means of left- and right-hand spindles generally designated respectively 57 and 58 of conventional construction and adapted to rotate the wheels about vertical axes. The left-hand spindle has a rearwardly extending flange 59 and the right-hand spindle has a similar rearwardly extending flange 60, the flanges 59 and 60 are connected together by means of a tierod 60a. Also connected to the flange 60 of the right-hand spindle 58 is a link 61 which is pivotally connected at 62 to the flange 60. The link 61 extends toward the center of the vehicle and is provided with a ball joint 62 (see FIGS. 2 and 5). The ball joint 62 includes an upwardly extending shaft 63 which is attached by means of a nut 64 to a rearwardly extending lever 65 rigidly secured to the bottom end of the drive shaft 34. Thus, the vehicle is turned by turning the handle bar 35 which rotates the drive shaft 34 to turn the lever 65. The lever 65 acts through the linkage 61 to rotate the right-hand spindle 58 which, inturn, is connected by means of the tierod 60a to the left-hand spindle 57.

A sub-frame 68 is formed in the general shape of a Y to form a yoke beneath the forward part of the vehicle. The yoke 68 includes two side frame bars 69 and 70 which have their forward ends welded to the front axle 47. A cross-bar 72 is welded between the two bars 69, 70 at the rear of the yoke 68, and a stud 73 is welded to the cross-bar 72. The stud 73 extends rearwardly of the yoke 68, and it is extended slightly downwardly so that its axis falls generally along the banking axis, indicated by the chain line 74 (see FIG. 2) which passes through the axis of the previously described bolt 54 and the point at which the rear wheel 12 engages the ground. It will be remembered that the bolt 54 forms the pivotal connection between the steering column 20 and the front axle assembly. A bushing block 75 is secured to the center of a transverse bar 76 (seen best in FIG. 2a) which is welded to the two side frame tubular portions 25, 26 (shown with the engine frame banked to the left in FIG. 2a). The bushing block 75 is provided with internal bushings for rotatably receiving the previously-described shaft 73, which is connected to the yoke 68. Thus, during banking action, the rider or engine frame 15 is permitted to rotate about the banking axis 74, but the bottom of that frame is constrained against lateral movement; and this results in a truer banking action whereby the centrifugal force exerted on the rider and engine frame are more directly alinged with the force transmission path through the vehicle, thereby generating a greater stability and comfort of ride.

Two transverse bars designated by reference numerals 80 and 81 in FIG. 2a are rigidly connected to the front axle 47 via the yoke 68 (as illustrated in FIG. 2a), and they extend to either side of the vehicle to support left and right foot rests 85, 86. On the right-hand foot rest 85 there is an accelerator pedal 87, and on the left hand foot rest 86 there is a brake pedal 88. It will be observed, therefore, that the foot rests are rigidly attached to the front axle assembly 13, and they do not tilt during banking action of the engine frame.

Turning now to FIGS. 4 and 5 the operation of the vehicle will now be described. When a rider desires to turn to the right, he turns the handle bar 35 in the appropriate direction and rotates the left-hand grip 36 to its rear position to actuate the switch 39 which energizes the linear actuator 40 to extend the rod 41. The pivotal connection 45 of the sleeve 42 of the actuator permits the axis of the actuator to shift slightly upwardly as the bracket 44 connected to the steering column 20 is moved upwardly. The upward movement of the bracket 44 caused by extension of the rod 41 rotates the steering column 20 about the pin 54 which pivotally interconnects the steering column 20 with the front axle 47. This action will cause the entire rider frame, motor, rear tire, etc. to bank as a unit about the banking axis 74 while constraining the lower end of the frame against lateral movement by means of the pivotal connection of the lower end of the frame 15 to the yoke 68 which is secured to the front axis 47.

The engine frame is uprighted after a turn by turning the left grip 36 to the forward position to reverse the polarity of the power feed to the linear actuator and thereby reverse its direction. To bank the vehicle in the opposite direction, the grip 36 is turned to first retract the rod 41 of the linear activator, and then to extend it to upright the vehicle. Thus, with the present invention, as can be seen in FIG. 5, a passenger experiences a true banking action with the angle being directed into the turn.

Having thus described in detail a preferred embodiment of the invention, persons skilled in the art will be able to modify certain of the structure which has been illustrated and to substitute equivalent elements for those which have been disclosed while continuing to practice the inventive principle. For example, the entire banking system could be rendered automatic, rather than manual, by using an accelerometer principle wherein a fluid such as mercury, upon being laterally displaced when the vehicle is turned, actuates the linear actuator 40, and then returns it to center when the turn is completed. A similar principle could be employed only to return the vehicle to its upright position after a turn, leaving the amount of banking to the control of the operator. It is, therefore, intended that all such modifications and substitutions be covered as they are embraced within the spirit and scope of the appended claims.

I claim:

1. A three-wheeled automotive vehicle comprising: a pair of front wheels; a front axle assembly interconnecting said front wheels; steering mechanism controllable by a rider and including a generally vertical steering column housing a steering shaft for turning said front wheels in unison relative to said front axle; first pivotal means for pivotally interconnecting the base of said steering column to said front axle assembly to permit rotation about a line extending in the center plane of said vehicle; a frame connected to said steering column including a rear wheel centered relative to said front wheels; actuator means for tilting said steering column and frame relative to the vertical center plane of said vehicle; and second pivotal means interconnecting said front axle assembly with said engine frame at a location spaced rearwardly of the pivotal interconnection between said steering column and said front axle, said first and second pivotal means having colinear axes of rotation to permit banking of said frame realtive to said front axle assembly about a single bank axis.

2. A three-wheeled automotive vehicle of the motor scooter type comprising: a pair of laterally spaced front wheels; a front axle assembly interconnecting said front wheels; a steering column pivotally connected at its base approximately midway between said front wheels and extending along a longitudinal centerplane of said vehicle; steering means including a shaft received in said steering column for steering said front wheels; a frame rigidly attached to said steering column and being generally symmetrical relative to said centerplane of said vehicle, said frame adapted to support a rider and the engine; a rear wheel rotatably mounted to the rear of said frame and located symmetrically relative to said centerplane; power means for selectively tilting said steering column and frame as a unit relative to said vehicle centerplane from a point on the axis of rotation of said pivotal interconnection between said steering column and said front axle assembly and the location at which said rear wheel engages the ground; second pivotal means interconnecting said frame and said front axle assembly along said banking axis for permitting rotation thereabout while preventing lateral displacement of the lower portion of said frame during banking; and foot pedal means rigidly attached to said front axle assembly to remain in a general horizontal disposition during banking and adapted to reveive accelerator and brake pedals respectively at either side of said frame.

3. The vehicle of claim 2 wherein said actuator means includes a linear accelerator pivotally interconnected at one end to said steering column and pivotally interconnected at its other end to said front axle assembly, said vehicle further comprising a handle bar provided with a grip and connected to said steering shaft to steer said front wheels; and switch means associated with said grip and actuatable when said grip is turned to supply electrical energy to said linear actuator, thereby to permit an operator to control the banking of said frame relative to said front axle assembly.

4. A three-wheeled automotive vehicle comprising: a pair of front wheels; an axle assembly interconnecting said front wheels; a generally upright steering column pivotally connected at its lower end to said front axle assemnly; a frame adapted to house an engine and to support a rider; a rear wheel rotatably mounted to the rear of said engine frame and located in the rear of said vehicle approximately midway between said front wheels when said vehicle is in an upright position; actuator means for tilting said engine frame relative to said front axle assembly to bank a rider and said engine frame into a turn when said front wheels are turned; a sub-frame including a yoke rigidly connected to said axle assembly and extending rearwardly thereof beneath said engine frame; means interconnecting said yoke and the bottom of said engine frame to constrain the bottom of said engine frame from lateral motion while permitting banking of said engine frame, and defining an axis of rotation generally in line with the axis of rotation of said steering column relative to said front axle assembly, both of said axes of rotation passing through the location of contact of said rear wheel with the ground thereby to define a banking axis for said steering column and said engine frame.

5. The vehicle of claim 4 further comprising foot rests rigidly attached to said front axle assembly and located rearwardly thereof to receive a rider's feet for supporting them.

6. The vehicle of claim 5 wherein said actuator means comprises an electrically operated linear actuator having one end pivotally connected to said front axle assembly and the other end pivotally connected to said steering column, said engine frame being rigidly connected to said steering column, whereby said steering column and engine frame bank as a unit.

7. The vehicle of claim 6 further comprising steering means including a transverse handle bar at the top of said steering column; a steering shaft extending through said steering column; and steering mechanism connected to said steering shaft to said front wheels when said handle bar is turned.

* * * * *